: US 12,051,868 B2
(45) Date of Patent: Jul. 30, 2024

(54) CONNECTOR, BATTERY MANAGEMENT UNIT AND BATTERY PACK

(71) Applicant: LG Energy Solution, Ltd., Seoul (KR)

(72) Inventor: Jae-Kuk Kwon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 396 days.

(21) Appl. No.: 17/424,830

(22) PCT Filed: Aug. 27, 2020

(86) PCT No.: PCT/KR2020/011509
§ 371 (c)(1),
(2) Date: Jul. 21, 2021

(87) PCT Pub. No.: WO2021/040438
PCT Pub. Date: Mar. 4, 2021

(65) Prior Publication Data
US 2022/0123491 A1    Apr. 21, 2022

(30) Foreign Application Priority Data
Aug. 27, 2019  (KR) .................. 10-2019-0105128

(51) Int. Cl.
*H01R 13/115*     (2006.01)
*H01M 10/42*     (2006.01)
(Continued)

(52) U.S. Cl.
CPC ........ *H01R 13/115* (2013.01); *H01M 10/425* (2013.01); *H01M 50/519* (2021.01); *H01R 12/718* (2013.01); *H01M 2010/4271* (2013.01)

(58) Field of Classification Search
CPC .. H01R 13/115; H01R 12/718; H01R 13/113; H01R 12/724; H01R 12/50; H01R 13/24;
(Continued)

(56) References Cited

U.S. PATENT DOCUMENTS 5,695,367 A    12/1997  Takano et al.
7,759,899 B2 *  7/2010  Hanawa .............. H01M 50/213
                                                          320/114
(Continued)

FOREIGN PATENT DOCUMENTS

CN    102405564 A      4/2012
CN    202602017 U  * 12/2012
(Continued)

OTHER PUBLICATIONS

International Search Report for PCT/KR2020/011509 (PCT/ISA/210) mailed on Dec. 18, 2020.
(Continued)

*Primary Examiner* — Briggitte R. Hammond
(74) *Attorney, Agent, or Firm* — Birch, Stewart, Kolasch & Birch, LLP

(57) ABSTRACT

A connector with increased heat dissipation efficiency and ease of use is provided. The connector includes a mounting portion having a main body and configured to be electrically connected to a printed circuit board of a battery management unit configured to manage voltages of a plurality of battery cells; and the connection portion including two or more connection terminals configured to contact a counterpart connection terminal and the connection portion including a concave-convex structure formed on a surface of each of the two or more connection terminals.

10 Claims, 8 Drawing Sheets

(51) Int. Cl.
*H01M 50/519* (2021.01)
*H01R 12/71* (2011.01)

(58) Field of Classification Search
CPC ............. H01M 10/425; H01M 50/519; H01M 2010/4271; H01M 50/213; H01M 10/6551; H01M 10/6553; H01M 50/284; H01M 50/249; H01M 50/559; H01M 50/20; H01M 10/482; H01M 10/623; H01M 2220/30; Y02E 60/10
USPC ........................................ 439/863, 856, 857
See application file for complete search history.

(56) References Cited

U.S. PATENT DOCUMENTS

| | | | | |
|---|---|---|---|---|
| 9,017,093 | B1* | 4/2015 | Packard, III | H02B 1/03 439/517 |
| 9,577,228 | B2* | 2/2017 | Naito | H01M 50/50 |
| 10,096,814 | B2* | 10/2018 | Naito | H01M 50/296 |
| 10,680,359 | B2* | 6/2020 | Geske | H01R 12/585 |
| 2006/0164812 | A1 | 7/2006 | Ha et al. | |
| 2012/0045667 | A1* | 2/2012 | Yoneda | H01M 50/296 429/7 |
| 2014/0106195 | A1 | 4/2014 | Milbourne et al. | |
| 2014/0113483 | A1 | 4/2014 | Chartrand et al. | |
| 2014/0272517 | A1 | 9/2014 | Glasgow et al. | |
| 2016/0056514 | A1 | 2/2016 | Ahn | |
| 2017/0317322 | A1 | 11/2017 | Milbourne et al. | |
| 2019/0097188 | A1 | 3/2019 | Oh et al. | |
| 2021/0005997 | A1* | 1/2021 | Wu | H01R 13/41 |

FOREIGN PATENT DOCUMENTS

| | | | |
|---|---|---|---|
| CN | 202602018 U | * | 12/2012 |
| CN | 202759105 U | | 2/2013 |
| CN | 107453104 A | | 12/2017 |
| CN | 109149196 A | | 1/2019 |
| EP | 2 528 166 B1 | | 9/2015 |
| EP | 3 696 904 A1 | | 8/2020 |
| GN | 2439118 Y | | 7/2001 |
| JP | 1-107481 A | | 4/1989 |
| JP | 1-126069 U | | 8/1989 |
| JP | 6-86268 U | | 12/1994 |
| JP | 7-223313 A | | 8/1995 |
| JP | 2001-345134 A | | 12/2001 |
| JP | 2002-270149 A | | 9/2002 |
| JP | 2010-205494 A | | 9/2010 |
| JP | 5573383 B2 | | 8/2014 |
| KR | 10-2011-0029194 A | | 3/2011 |
| KR | 10-2016-0024311 A | | 3/2016 |
| KR | 10-2016-0057150 A | | 5/2016 |
| KR | 10-2017-0010667 A | | 2/2017 |
| KR | 10-1733525 B1 | | 5/2017 |
| KR | 10-2017-0141370 A | | 12/2017 |
| KR | 10-2018-0018920 A | | 2/2018 |
| KR | 10-2019-0071027 A | | 6/2019 |
| WO | WO 2006/039123 A1 | | 4/2006 |
| WO | WO 2010/096567 A1 | | 8/2010 |

OTHER PUBLICATIONS

Extended European Search Report for European Application No. 20856379.1, dated Apr. 22, 2022.

* cited by examiner

CONNECTOR, BATTERY MANAGEMENT UNIT AND BATTERY PACK

TECHNICAL FIELD

The present disclosure relates to a connector, a battery management unit, and a battery pack, and more particularly, to a connector with increased heat dissipation efficiency and ease of use.

The present application claims priority to Korean Patent Application No. 10-2019-0105128 filed on Aug. 27, 2019 in the Republic of Korea, the disclosures of which are incorporated herein by reference.

BACKGROUND ART

Recently, secondary batteries capable of charging and discharging have been widely used as an energy source for wireless mobile devices. In addition, secondary batteries are attracting attention as a power source for electric vehicles (EVs) and hybrid electric vehicles (HEVs), which are proposed as a solution to air pollution such as existing gasoline vehicles and diesel vehicles that use fossil fuels.

In small mobile devices, one or two or three battery cells per device are used, whereas in medium and large devices such as automobiles, due to the need for high power and large capacity, medium and large battery modules electrically connecting multiple battery cells are used. A battery pack implemented by connecting such multiple battery cells is used.

Since such battery packs are preferably manufactured in a small size and weight as possible, battery packs may be stacked with a high degree of integration, and square shape cells, pouch type cells, etc. having a small weight to capacity are mainly used as battery cells applied to a battery pack.

In addition, in order for the battery pack to provide output and capacity required in a given apparatus or device, it is necessary to electrically connect a plurality of battery cells in series, in parallel, or in a combination of series and parallel. For example, the battery cells included in the battery pack may be welded to a plurality of bus bar plates provided with electrode terminals in the form of metal plates and electrically connected in series, in parallel, or in a combination of series and parallel.

Moreover, since the battery pack has a structure in which a plurality of battery cells are combined, the battery pack requires a sensing means capable of sensing a current generated from the battery cells in order to detect when some battery cells are overvoltage, overcurrent, or overheating. Such sensing means are individually connected to the battery cells to provide voltage/current information of the battery cells to a battery management unit.

Such a battery management unit may include a printed circuit board in which a printed circuit is embedded. In addition, the battery management unit needs a connector mounted on the printed circuit board in order to exchange signals with an external device or to receive power from the outside to charge the battery cells or to supply power to the external device to discharge the battery cells. Such a connector may be repeatedly connected to and disconnected from a counterpart connector.

However, in the related art, because a high current flows through a connector applied to a high capacity and high current battery pack, it is easy to heat up to a high temperature due to electrical resistance. Accordingly, a high temperature connector may damage a printed circuit board which is an internal configuration of the battery pack, or a contacted pack housing may melt, and there is a high possibility of getting burned when a user holds the battery pack with his or her hand.

DISCLOSURE

Technical Problem

The present disclosure is designed to solve the problems of the related art, and therefore the present disclosure is directed to providing a connector with increased heat dissipation efficiency and ease of use.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a connector including a mounting portion electrically connected to a printed circuit board of a battery management unit configured to manage voltages of a plurality of battery cells; and a connection portion comprising two or more connection terminals configured to contact a counterpart connection terminal and comprising a concave-convex structure formed on an outer surface of the connection terminal.

The concave-convex structure may include a plurality of grooves respectively formed in the two or more connection terminals.

The plurality of grooves may be formed in an inner side surface of the two or more connection terminals facing each other, an outer side surface that is an opposite surface to the inner side surface, or the inner side surface and the outer side surface.

The concave-convex structure may include a plurality of protrusions respectively formed in the two or more connection terminals.

The plurality of protrusions may be formed on an inner side surface of the two or more connection terminals facing each other, an outer side surface that is an opposite surface to the inner side surface, or the inner side surface and the outer side surface.

The two or more connection terminals may have a shape extending side by side in one direction from a main body of the mounting portion.

The two or more connection terminals may be configured such that the counterpart connection terminal is inserted between the two or more connection terminals.

An end portion of each of the plurality of protrusions formed on the inner side surface of the connection terminal may protrude to contact the counterpart connection terminal.

The plurality of protrusions formed on the inner side surface of the connection terminal may have different sizes protruding toward the counterpart connection terminal.

The end portion of each of the plurality of protrusions formed on the inner side surface of the connection terminal may include a bending structure bent in a direction in which the counterpart connection terminal is inserted.

In another aspect of the present disclosure, there is provided a battery management unit including a connector and a printed circuit board electrically connected to the connector.

In another aspect of the present disclosure, there is provided a battery pack including the battery management unit.

Advantageous Effects

According to an aspect of the present disclosure, a connection portion includes two or more connection terminals configured to contact a counterpart connection terminal, and a concave-convex structure formed on an outer surface of the connection terminal, and thus, when a connector of the present disclosure transmits a current to the counterpart connection terminal, the connector may effectively dissipate heat generated by resistance to air. Accordingly, it is possible to prevent the connector from having high heat and damaging a printed circuit board. In addition, it is possible to effectively reduce an increase in the internal temperature of a battery pack.

In addition, according to an aspect of the present disclosure, a plurality of grooves are formed in inner side surfaces and outer side surfaces of the two or more connection terminals facing each other, and thus, compared to the case where the concave-convex structure is formed only on one side of the inner side surface and the outer side surface, it is possible to further increase a heat dissipation area. Accordingly, it is possible to effectively increase the amount of heat dissipation of the connector.

Moreover, according to an aspect of the present disclosure, a plurality of protrusions are formed on inner side surfaces and outer side surfaces of the two or more connection terminals facing each other, and thus, compared to the case where the concave-convex structure is formed only on one side of the inner side surface and the outer side surface, it is possible to further increase a heat dissipation area. Accordingly, it is possible to effectively increase the amount of heat dissipation of the connector.

In addition, according to an aspect of the present disclosure, an end portion of each of a plurality of protrusions formed on the inner side surface of the connection terminal protrudes to contact the counterpart connection terminal, and thus the present disclosure may effectively increase contact points between the connection terminal and the counterpart connection terminal. Accordingly, it is possible to improve the connection reliability of the connector 100A. Furthermore, the protrusions may elastically guide an insertion direction of the counterpart connection terminal.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
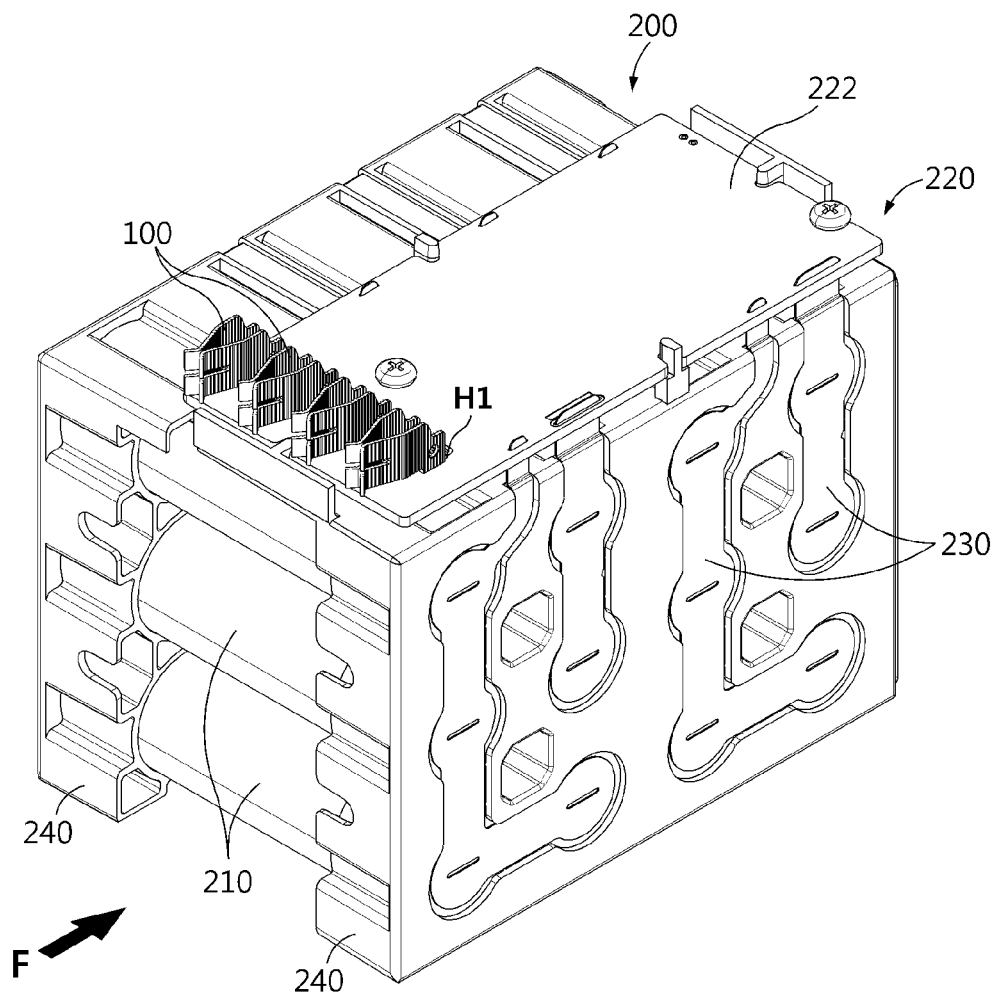
FIG. 1 is a front perspective view schematically showing a connector and a battery pack according to an embodiment of the present disclosure.
Figure 2:
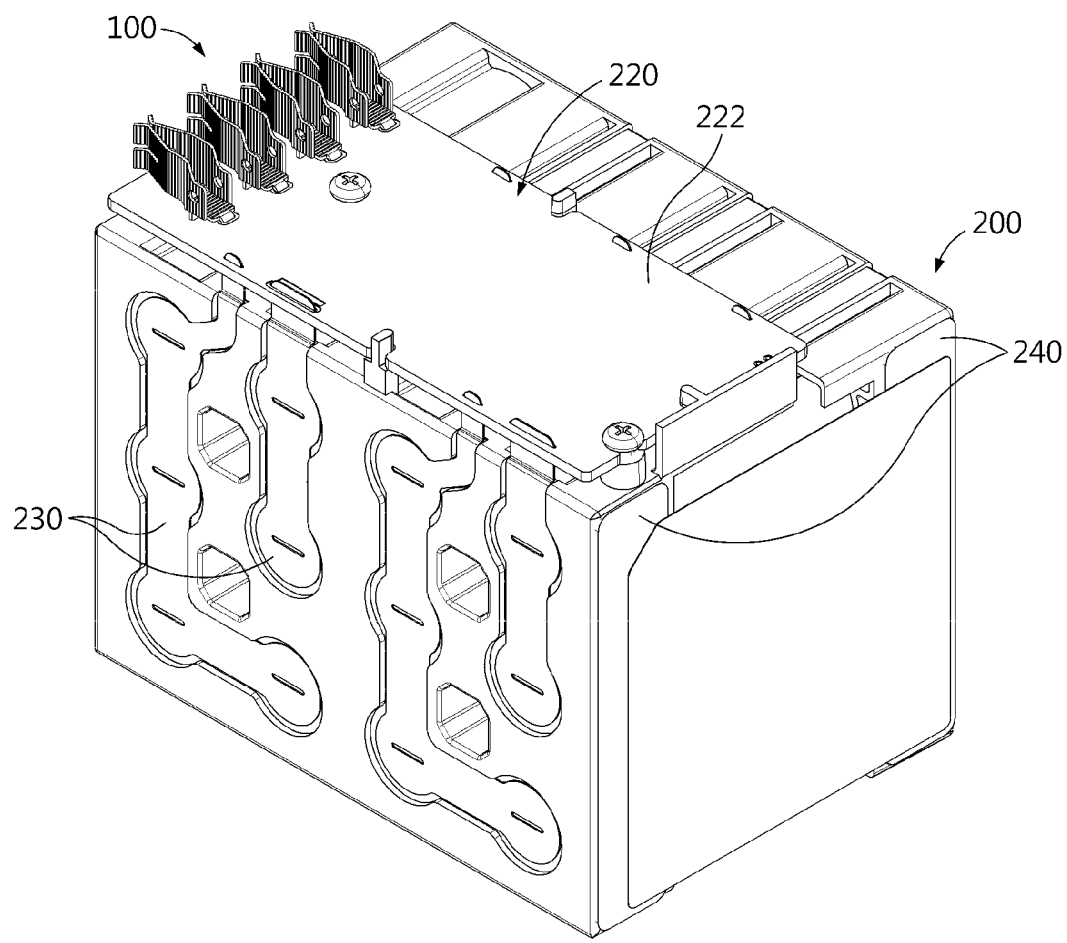
FIG. 2 is a rear perspective view schematically showing a connector and a battery pack according to an embodiment of the present disclosure.
Figure 3:
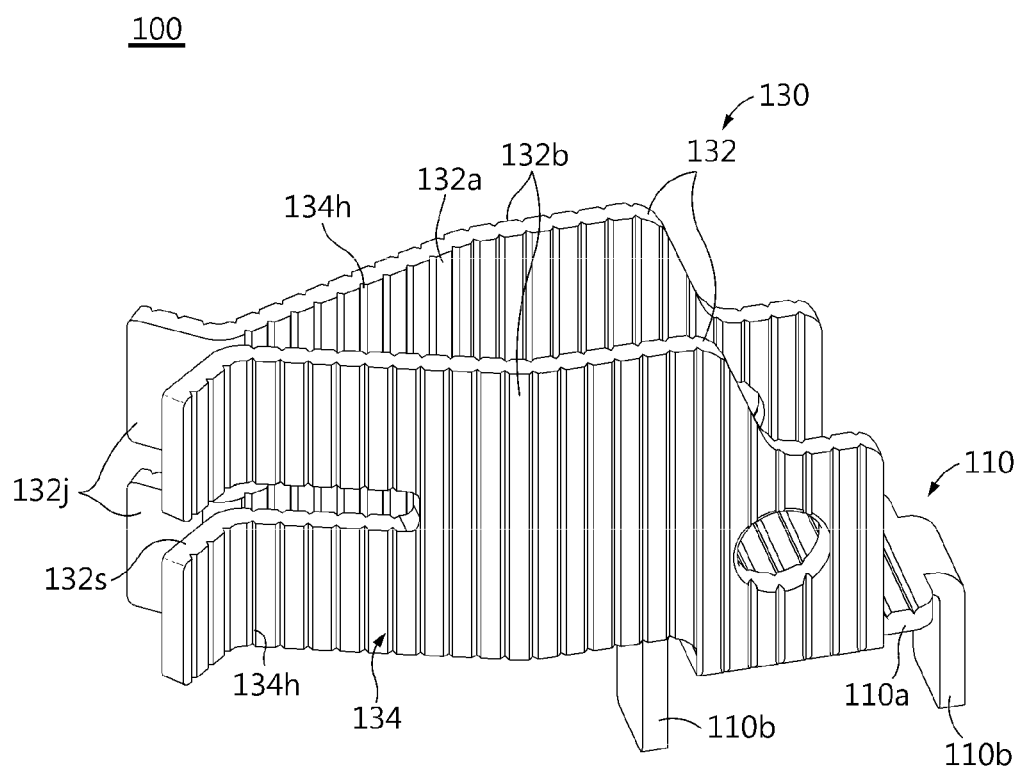
FIG. 3 is a perspective view schematically showing a connector according to an embodiment of the present disclosure.

FIG. 1 is a front perspective view schematically showing a connector and a battery pack according to an embodiment of the present disclosure. FIG. 2 is a rear perspective view schematically showing a connector and a battery pack according to an embodiment of the present disclosure. FIG. 3 is a perspective view schematically showing a connector according to an embodiment of the present disclosure.

Referring to FIGS. 1 to 3, a connector 100 according to an embodiment of the present disclosure includes a mounting portion 110 and a connection portion 130.

Specifically, the mounting portion 110 may be configured to be electrically connected to a printed circuit board 222 provided in a battery management unit 220 configured to manage voltages of a plurality of battery cells 210. The mounting portion 110 may include a lead 110b connected to a printed circuit embedded in the printed circuit board 222. The lead 110b may have a shape protruding downward.

A part of the lead 110b may be inserted through the printed circuit board 222. The lead 110b may have a structure extending downward to be electrically connected to the printed circuit board 222. The lead 110n may be inserted into the through hole H1 provided in the printed circuit board 222 and electrically connected to the printed circuit of the printed circuit board 222 by soldering.

In addition, the mounting portion 110 may include a main body 110a having an end portion connected to the lead 110b. For example, as shown in FIG. 3, when viewed in the F direction of FIG. 1, the mounting portion 110 may include the main body 110a of a plate shape extending in a horizontal direction, and two leads 110b bent downward and extending from both ends of the main body 110a in a front and rear direction.

Here, terms representing directions such as before, after, left, right, up, and down described in the present specification may vary depending on the position of an observer or the shape of an object that is placed. However, in the present specification, for convenience of description, the directions such as front, rear, left, right, up, and down are indicated separately based on when viewed in the F direction.

Figure 6:
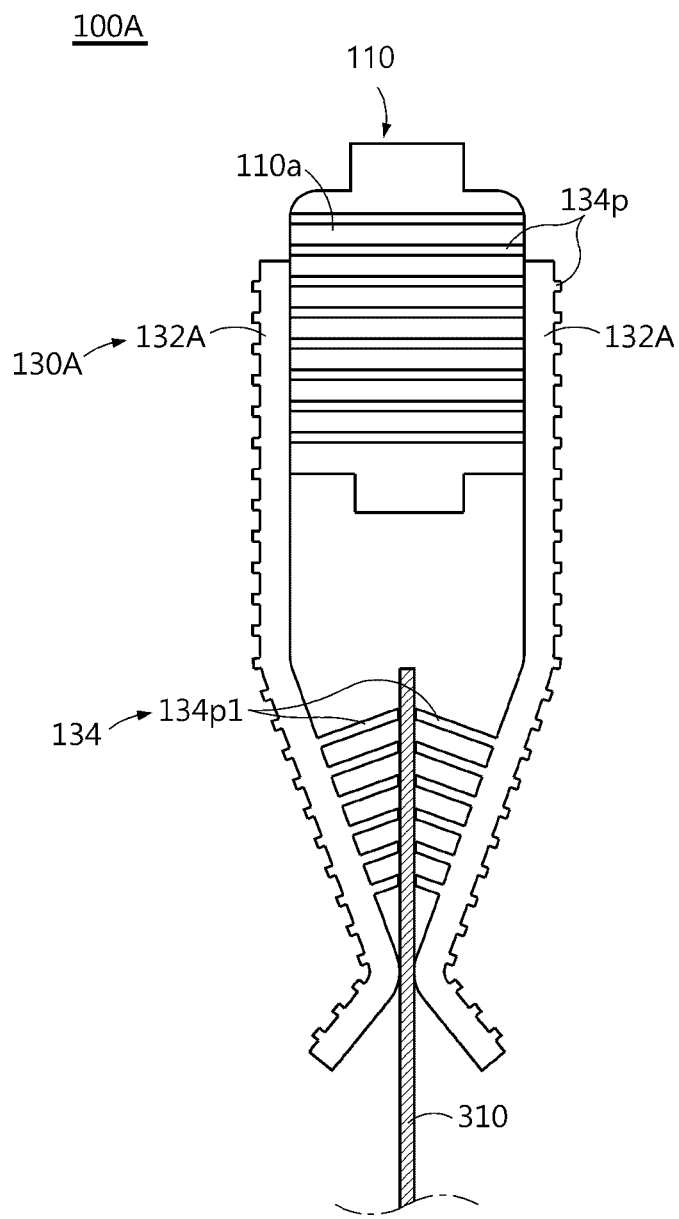
FIG. 6 is a plan view schematically showing a connector according to another embodiment of the present disclosure.

Specifically, the connection portion 130 may have a plate shape erected in a vertical direction to contact a counterpart connection terminal (see 310 of FIG. 6). Here, the 'counterpart connection terminal 310' refers to a connection terminal that contacts the connector 100 in order for the connector 100 to transfer a current transferred from a plurality of battery cells 210 to an external device or receive power from a charger to charge the plurality of battery cells 210. That is, power of a battery pack 200 may be supplied to an external device through the counterpart connection terminal 310. The external device may be, for example, an electric motor (not shown) of a vacuum cleaner.

The counterpart connection terminal 310 may include an alloy having aluminum, nickel, copper, or the like having excellent electrical conductivity. Likewise, the connection portion 130 and the mounting portion 110 may include an alloy having aluminum, nickel, copper, etc. having excellent electrical conductivity.

Figure 4:
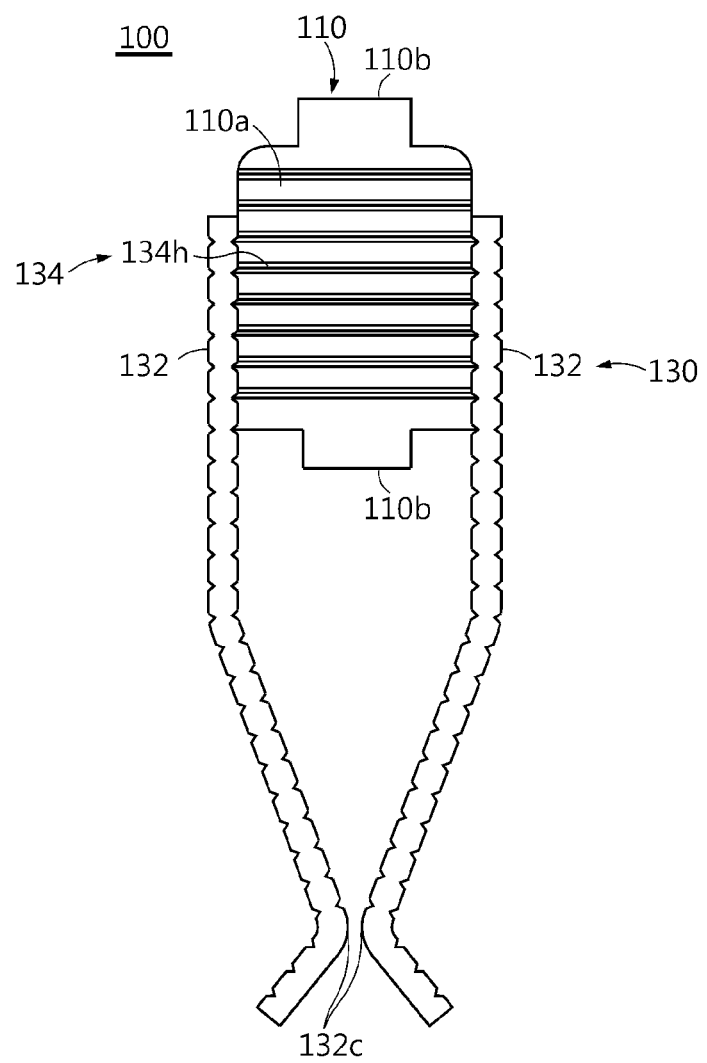
FIG. 4 is a plan view schematically showing a connector according to an embodiment of the present disclosure.

FIG. 4 is a plan view schematically showing a connector according to an embodiment of the present disclosure.

Referring back to FIG. 4 along with FIG. 3, the connection portion 130 includes a concave-convex structure 134 to increase a heat dissipation surface area. For example, the concave-convex structure 134 may include a plurality of grooves 134h formed in the respective two or more connection terminals 132. The groove 134h may have a shape linearly extending in a vertical direction in an outer surface of the connection portion 130. The plurality of grooves 134h may be arranged to be spaced apart by a predetermined distance in a front and rear direction.

Accordingly, according to this configuration of the present disclosure, the connection portion 130 includes the two or more connection terminals 132 configured to contact the counterpart connection terminal 310, and the concave-convex structure 134 formed on the outer surface of the connection terminal 132, and thus, when the connector 100 of the present disclosure transmits a current to the counterpart connection terminal 310, the connector 100 may effectively dissipate heat generated by resistance to air. Accordingly, it is possible to prevent the connector 100 from having high heat and damaging the printed circuit board 222. In addition, it is possible to effectively reduce an increase in the internal temperature of the battery pack 200.

More specifically, the plurality of grooves 134h may be formed in an inner side surface 132a of each of the two or more connection terminals 132 facing each other, an outer side surface 132b that is an opposite surface to the inner side surface 132a, or the inner side surface 132a and the outer side surface 132b. For example, as shown in FIG. 3, the plurality of grooves 134h may be provided in the inner side surface 132a and the outer side surface 132b of the two or more connection terminals 132.

Accordingly, according to this configuration of the present disclosure, the plurality of grooves 134h are formed in the inner side surfaces 132a and the outer side surfaces 132b of the two or more connection terminals 132 facing each other, and thus, compared to the case where the concave-convex structure 134 is formed only on one side of the inner side surface 132a and the outer side surface 132b, the heat dissipation area may further increase. Accordingly, the amount of heat dissipation of the connector 100 may effectively increase.

Referring back to FIGS. 3 and 4, the two or more connection terminals 132 may have a shape extending side by side in one direction from the main body 110a of the mounting portion 110. For example, as shown in FIG. 4, the two connection terminals 132 may have a plate shape extending in an upper direction from both ends of the main body 110a of the mounting portion 110 in the left and right direction. A part of the two connection terminals 132 may have a shape protruding forward from the main body 110a of the mounting portion 110.

In addition, the two or more connection terminals 132 may be configured such that the counterpart connection terminal (310 of FIG. 6) is inserted between the two or more connection terminals 132. For example, as shown in FIG. 4, the two connection terminals 132 may be configured such that the counterpart connection terminal 310 is inserted between the two connection terminals 132.

Moreover, the connection terminal 132 may be elastically deformable and may have a contact structure 132c. For example, the contact structure 132c of each of the two or more connection terminals 132 may be configured to contact the counterpart connection terminal 310. As shown in FIG. 4, the counterpart connection terminal (310 of FIG. 6) may be interposed between the respective contact structures 132c of the two connection terminals 132. In this regard, the elastically deformed contact structure 132c of the connection terminal 132 may pressurize an outer surface of the counterpart connection terminal 310.

Further, the contact structures 132c of the two or more connection terminals 132 may extend in a direction in which the contact structures 132c are closer to each other forward, and then extend in a direction in which the contact structures 132c are away from each other at a predetermined distance. For example, as shown in FIG. 4, the contact structures 132c are provided in the respective two connection terminals 132, and the contact structures 132c may extend in a direction in which the contact structures 132c are closer to each other forward, and then extend in a direction in which the contact structures 132c are away from each other at a predetermined distance.

Further, in order to improve the reliability of contact between the contact structure 132c of each of the two or more connection terminals 132 and the counterpart connection terminal 310, the two or more connection terminals 132 may include cutting structures 13j to be divided into a plurality of individual terminals. The cutting structure 132j may have a slit 132s extending in a horizontal direction so that some of the two or more connection terminals 132 are divided in a vertical direction. That is, as shown in FIG. 3, the two or more connection terminals 132 may include the cutting structure 132j that is cut in a horizontal direction from a front end thereof to a predetermined depth. Accordingly, the connection portion 130 may have four connection points with the counterpart connection terminal (310 in FIG. 6).

Figure 5:
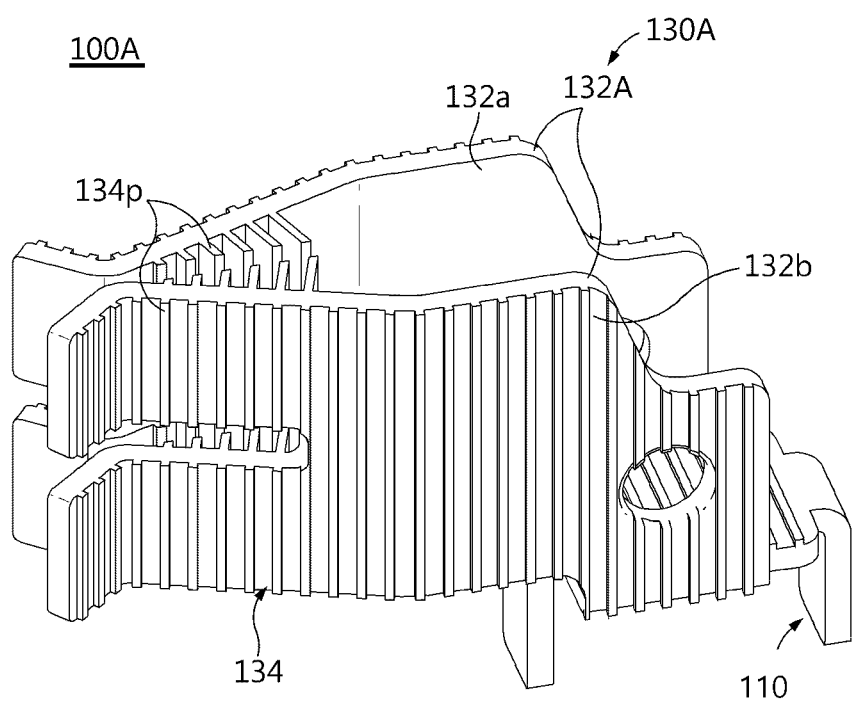
FIG. 5 is a perspective view schematically showing a connector according to another embodiment of the present disclosure.

FIG. 5 is a perspective view schematically showing a connector according to another embodiment of the present disclosure. FIG. 6 is a plan view schematically showing a connector according to another embodiment of the present disclosure.

Referring to FIGS. 5 and 6, the concave-convex structure 134 of a connector 100A according to another embodiment may include a plurality of protrusions 134p formed on the respective two or more connection terminals 132A. Here, the protrusion 134p may have a shape linearly extending in a vertical direction on an outer surface of the connection portion 130A. The plurality of protrusions 134p may be arranged spaced apart by a predetermined distance in a front and rear direction.

More specifically, the plurality of protrusions 134*p* may be formed on the inner side surface 132*a* of each of the two or more connection terminals 132A facing each other, the outer side surface 132*b* that is an opposite surface to the inner side surface 132*a*, or the inner side surface 132*a* and the outer side surface 132*b*. For example, as shown in FIG. 6, the plurality of protrusions 134*p* may be provided on the inner side surface 132*a* and the outer side surface 132*b* of the two or more connection terminals 132A.

Accordingly, according to this configuration of the present disclosure, the plurality of protrusions 134*p* are formed on the inner side surfaces 132*a* and the outer side surfaces 132*b* of the two or more connection terminals 132A facing each other, and thus, compared to the case where the concave-convex structure 134 is formed only on one side of the inner side surface 132*a* and the outer side surface 132*b*, the heat dissipation area may further increase. Accordingly, the amount of heat dissipation of the connector 100A may effectively increase.

Referring back to FIG. 6, an end portion of each of the plurality of protrusions 134*p*1 formed on the inner side surface 132*a* of the connection terminal 132A may protrude to contact the counterpart connection terminal 310. That is, the plurality of protrusions 134*p*1 may protrude in a direction in which the counterpart connection terminal 310 is located. In addition, the end portions of the plurality of protrusions 134*p*1 in a protruding direction may be configured to contact a side surface of the connection terminal 132A in the horizontal direction.

In addition, the plurality of protrusions 134*p*1 formed on the inner side surface 132*a* of the connection terminal 132A may have different sizes protruding toward the counterpart connection terminal 310. For example, as shown in FIG. 6, the plurality of protrusions 134*p*1 may be configured to have a longer length protruding toward the counterpart connection terminal 310 as the plurality of protrusions 134*p*1 are located on the rear. In this regard, the protrusion may be integral with the connection terminal 132A, and may include an electrically conductive metal.

Accordingly, according to this configuration of the present disclosure, the end portion of each of the plurality of protrusions 134*p*1 formed on the inner side surface 132*a* of the connection terminal 132A protrudes to contact the counterpart connection terminal 310, and thus the present disclosure may effectively increase contact points between the connection terminal 132A and the counterpart connection terminal 310. Accordingly, the connection reliability of the connector 100A may be improved. Furthermore, the protrusions 134*p*1 may elastically guide an insertion direction of the counterpart connection terminal 310.

Figure 7:
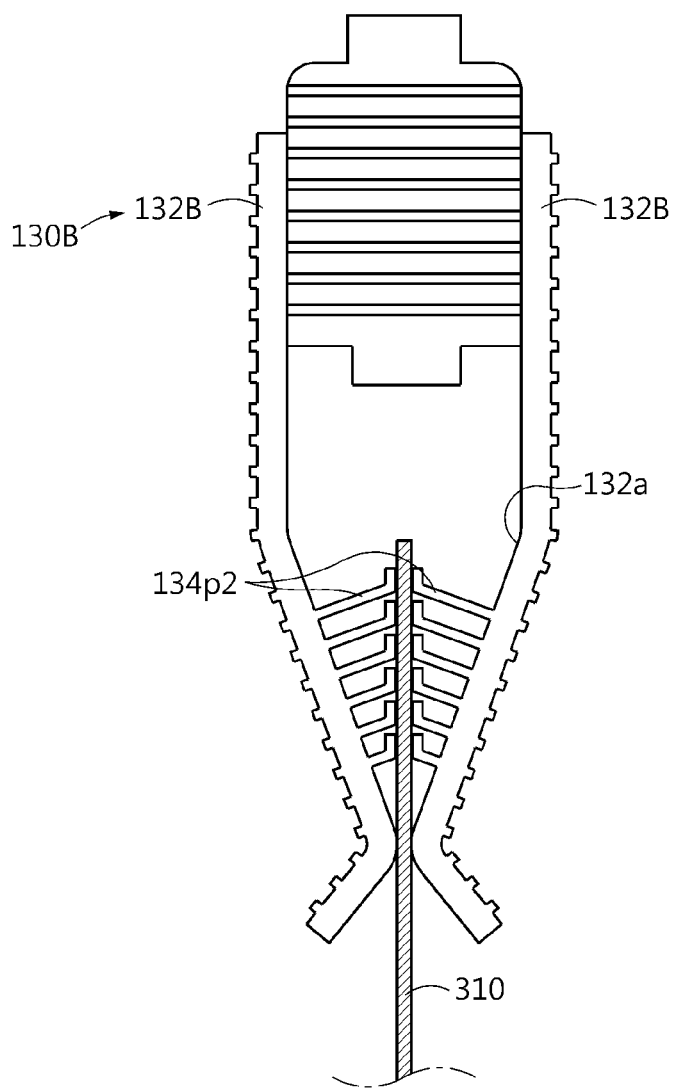
FIG. 7 is a plan view schematically showing a connector according to another embodiment of the present disclosure.

FIG. 7 is a plan view schematically showing a connector according to another embodiment of the present disclosure. When compared with the connector 100A of FIG. 6, a connector 100B shown in FIG. 7 has the same structures and configurations, except that the formation of protrusions provided on the inner side surface 132*a* is different. Therefore, descriptions of the remaining configurations of the connector 100B of FIG. 7 are omitted.

Referring back to FIG. 7, in the connector 100B according to another embodiment, an end portion of each of a plurality of protrusions 134*p*2 formed on the inner side surface 132*a* of the connection terminal 132B of a connection portion 130B may have a bending structure bent in a direction in which the counterpart connection terminal 310 is inserted. This is to prevent an increase in the friction when the counterpart connection terminal 310 is inserted and contacts the plurality of protrusions 134*p*2. The bent end portion of each of the plurality of protrusions 134*p*2 may be configured to guide the direction in which the counterpart connection terminal 310 is inserted.

For example, as shown in FIG. 7, the end portion of each of the plurality of protrusions 134*p*2 formed on the inner side surface 132*a* of the connection terminal 132B has the structure bent in the direction into which the counterpart connection terminal 310 is inserted, and thus the friction generated in a process of inserting the counterpart connection terminal 310 may be effectively reduced, so that the counterpart connection terminal 310 may be inserted smoothly. Accordingly, there is an advantage in that it is easy to connect the counterpart connection terminal 310 and the connection terminal 132B.

Figure 8:
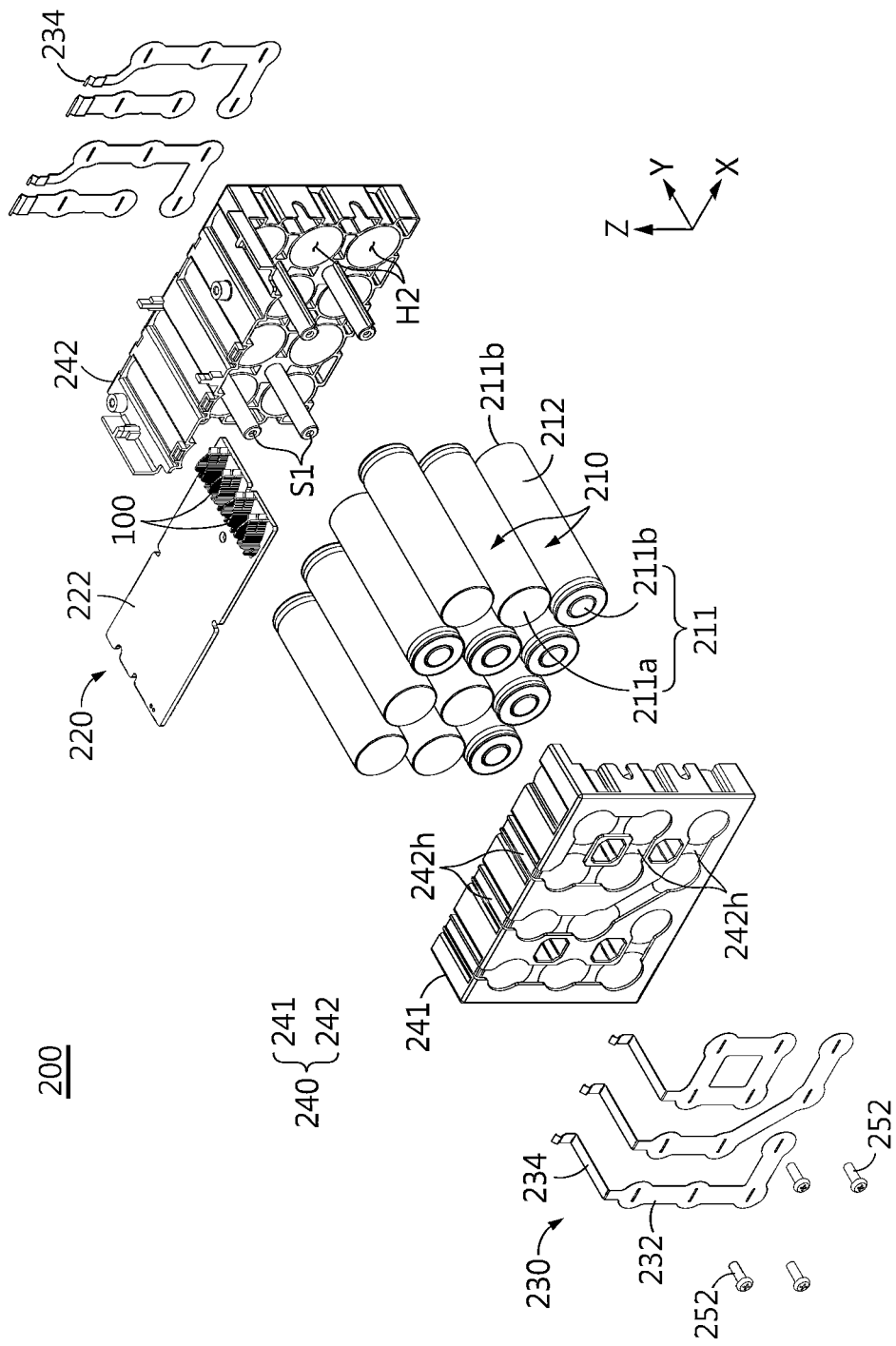
FIG. 8 is an exploded perspective view schematically showing components of a battery pack according to an embodiment of the present disclosure.

FIG. 8 is an exploded perspective view schematically showing components of a battery pack according to an embodiment of the present disclosure.

Referring to FIG. 8, the battery management unit 220 according to the present disclosure includes the plurality of connectors 100 and the printed circuit board 222 electrically connected to the plurality of connectors 100.

Moreover, the battery pack 200 according to the present disclosure includes the battery pack 200 including the plurality of battery cells 210 and the battery management unit 220. That is, the battery pack 200 according to the present disclosure may include the battery management unit 220 as various devices for controlling charging and discharging of the plurality of battery cells 210.

Specifically, the battery cell 210 may be a cylindrical battery cell. In addition, the cylindrical battery cell 210 may include a cylindrical battery can 212 and an electrode assembly (not shown) accommodated in the battery can 212.

Here, the battery can 212 includes a material having high electrical conductivity, and for example, the battery can 212 may include aluminum, steel, or copper. In addition, electrode terminals 211*a* and 211*b* may be respectively formed on both ends of the battery can 212 in a horizontal direction.

Specifically, the electrode terminal 211 may include a first electrode terminal 211*a* and a second electrode terminal 211*b* having different electrical polarities. In addition, when viewed in the F direction (shown in FIG. 1), the first electrode terminal 211*a* may be formed on one end (a front end) of the battery can 212 in the horizontal direction, and the second electrode terminal 211*b* may be formed on the other end (a rear end) in the horizontal direction.

Here, terms representing directions such as before, after, left, right, up, and down described in the present specification may vary depending on the position of an observer or the shape of an object that is placed. However, in the present specification, for convenience of description, the directions such as front, rear, left, right, up, and down are indicated separately based on when viewed in the F direction.

Further, the electrode assembly may be formed in a structure wound in a jelly-roll type with a separator interposed between a positive electrode and a negative electrode. In addition, a positive electrode tab (not illustrated) may be attached to the positive electrode (not illustrated) to be connected to the first electrode terminal 211*a* on the front end of the battery can 212. Furthermore, a negative electrode tab (not illustrated) may be attached to the negative electrode (not illustrated) to be connected to the second electrode terminal 211*b* on the rear end of the battery can 212.

For example, as shown in FIG. 2, the battery pack 200 may include 12 cylindrical battery cells 210 arranged in one direction. In addition, the first electrode terminals 211*a* of the 12 cylindrical battery cells 210 may be disposed to be adjacent to the second electrode terminals 211b having different polarities.

However, the battery cell 210 according to the present disclosure is not limited to the cylindrical battery cell 210 described above, and various types of battery cells 210 known at the time of filing of the present application may be employed.

The battery pack 200 may further include a pack housing 240 in which an internal space accommodating the plurality of battery cells 210 is formed.

Specifically, the pack housing 240 may include an electrically insulating material. For example, the pack housing 240 may include a plastic material such as polyvinyl chloride. In addition, the pack housing 240 may include a first case 241 and a second case 242. A plurality of hollow structures H2 may be formed in the first case 241 and the second case 242 to surround an outer surface of an upper portion or a lower portion of the cylindrical battery cell 210 so that a plurality of cylindrical battery cells 210 may be accommodated.

Furthermore, a bolt fastening structure may be formed in the first case 241 and the second case 242. For example, as shown in FIG. 8, fastening holes S1 configured to make four bolts 252 inserted thereinto may be formed in the first case 241 and the second case 242. In addition, the four bolts 252 are fastened to the fastening holes S1 of the first case 241 and the second case 242, so that a rear portion of the first case 241 and a front portion of the second case 242 may be coupled to each other.

In addition, inlet grooves 242h may be formed in outer surfaces of the first case 241 and the second case 242 of the pack housing 240 so that at least a part of the connection portion 232 and the sensing portion 234 of the bus bar plate 230 is inserted and fixed.

Specifically, the inlet groove 242h formed on the outer surface of the pack housing 240 may have an inner surface having a size corresponding to the outer shape of the bus bar plate 230. For example, as shown in FIG. 2, the inlet groove 242h into which the connection portion 232 of the bus bar plate 230 may be inserted and embedded may be formed in the outer surface of the front of the first case 241.

In addition, the inlet groove 242h into which a part of the sensing portion 234 of the bus bar plate 230 may be inserted and fixed may be formed in an upper outer surface of the first case 241. Similarly, the inlet groove 242h may also be formed in a rear outer surface and an upper outer surface of each of the second case 242 of the pack housing 240 so that a part of the connection portion 232 and the sensing portion 234 of the bus bar plate 230 may be inserted and fixed.

Accordingly, according to this configuration of the present disclosure, the inlet grooves 242h may be formed in the outer surface of the pack housing 240 so that at least a part of the connection portion 232 and the sensing portion 234 of the bus bar plate 230 is inserted and fixed, and thus the busbar plate 230 may stably establish an electrical connection between the plurality of battery cells 210, and prevent the busbar plate 230 from being damaged from external substances. In addition, since the sensing portion 234 of the bus bar plate 230 may be prevented from flowing due to an external impact, the electrical connection between the battery management unit 220 and the plurality of battery cells 210 may be stably maintained. Accordingly, durability of the battery pack 200 may be improved.

In addition, the printed circuit board 222 on which the plurality of connectors 100 are mounted may be mounted to the upper portion of the pack housing 240.

Meanwhile, in the present specification, although the terms indicating directions such as up, down, left, right, front, and back are used, it is apparent to those skilled in the art that these terms are for convenience of explanation only and vary depending on the position of a target object or the position of an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

[Description of Reference Numerals]

| | |
|---|---|
| 100: connector | 110: mounting portion |
| 130: connection portion | 132: connection terminal |
| 134: concave-convex structure | 134h: groove |
| 134p, 134p1, 134p2: protrusion | 132a, 132b: inner side surface, outer side surface |
| 200: battery pack | |
| 220: battery management unit | 210: battery cell |
| | 222: printed circuit board |

INDUSTRIAL APPLICABILITY

The present disclosure relates to a connector. Further, the present disclosure is applicable to a battery pack to which the connector is applied and an electronic device industry including the battery pack.

What is claimed is:

1. A connector comprising:
a mounting portion having a main body, and configured to be electrically connected to a printed circuit board of a battery management unit configured to manage voltages of a plurality of battery cells; and
a connection portion comprising two or more connection terminals configured to contact a counterpart connection terminal and the connection portion comprising a concave-convex structure formed on an outer side surface and an inner side surface of each of the two or more connection terminals,
wherein the concave-convex structure comprises a plurality of protrusions respectively formed in each of the two or more connection terminals,
wherein the plurality of protrusions are formed on both the inner side surface of each of the two or more connection terminals that are facing each other, and the outer side surface that is an opposite surface to the inner side surface,
wherein the two or more connection terminals extend side by side in one direction from the main body of the mounting portion,
wherein the two or more connection terminals are configured to have the counterpart connection terminal be inserted between the two or more connection terminals,
wherein an end portion of each of the plurality of protrusions formed on the inner side surface of each of the two or more connection terminals protrudes to contact the counterpart connection terminal, and
wherein the end portion of each of the plurality of protrusions formed on the inner side surface of each of the two or more connection terminals comprises a bending structure bent in a direction in which the counterpart connection terminal is inserted.

2. The connector of claim 1,
wherein the concave-convex structure comprises a plurality of grooves respectively formed in the two or more connection terminals.

3. The connector of claim 2,
wherein the plurality of grooves are formed in both the inner side surface of each of the two or more connection terminals that are facing each other, and the outer side surface that is an opposite surface to the inner side surface.

4. The connector of claim 1,
wherein the plurality of protrusions formed on the inner side surface of each of the two or more connection terminals protruding toward the counterpart connection terminal have different sizes.

5. A battery management unit comprising the connector according to claim 1, and a printed circuit board electrically connected to the connector.

6. A battery pack comprising the battery management unit according to claim 5.

7. The connector of claim 1, wherein each of the two or more connection terminals have a contact structure that is configured to contact the counterpart connection terminal, and have a bend that directs the contact structure towards each other.

8. The connector of claim 7, wherein the contact structure and the main body are located at opposite ends of the two or more connection terminals.

9. The connector of claim 8,
wherein the plurality of protrusions are located between the contact structure and the main body.

10. The connector of claim 9, wherein ends of the plurality of protrusions are directed toward the main body.

* * * * *